(12) United States Patent
Ge (10) Patent No.: US 11,995,274 B2
(45) Date of Patent: May 28, 2024

(54) MASK, DISPLAY PANEL, AND METHOD FOR MANUFACTURING THEREOF

(71) Applicant: TCL CHINA STAR OPTOELECTRONICS TECHNOLOGY CO., LTD., Guangdong (CN)

(72) Inventor: Xianjin Ge, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/822,794

(22) Filed: Aug. 28, 2022

(65) Prior Publication Data

US 2022/0413642 A1  Dec. 29, 2022

Related U.S. Application Data

(63) Continuation of application No. 17/057,640, filed as application No. PCT/CN2020/108136 on Aug. 10, 2020, now Pat. No. 11,520,441.

(30) Foreign Application Priority Data

Jul. 13, 2020 (CN) .......................... 202010667733.6

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04103* (2013.01); *G06F 2203/04107* (2013.01)

(58) Field of Classification Search
CPC ................... G06F 3/0412; G06F 3/044; G06F 2203/04103; G06F 2203/04107
See application file for complete search history.

(56) References Cited

U.S. PATENT DOCUMENTS 9,137,882 B2 * 9/2015 Yoo ........................... H05F 3/00
9,417,746 B2 * 8/2016 Tada ..................... G06F 3/0443
(Continued)

FOREIGN PATENT DOCUMENTS

CN          203117594 U    8/2013
CN          103296021 A    9/2013
(Continued)

OTHER PUBLICATIONS

International Search Report in International application No. PCT/CN2020/108136, dated Mar. 31, 2021.
Written Opinion of the International Search Authority in International application No. PCT/CN2020/108136, dated Mar. 31, 2021.
Chinese Office Action issued in corresponding Chinese Patent Application No. 202010667733.6 dated Apr. 19, 2021, pp. 1-11.

*Primary Examiner* — Doon Y Chow
(74) *Attorney, Agent, or Firm* — PV IP PC; Wei Te Chung; Zhigang Ma (57) ABSTRACT

The present invention provides a mask, a display panel, and a method for manufacturing thereof. The display panel includes a display area and a peripheral area surrounding the display area, and the peripheral area comprises a wiring area and a bonding area. The wiring area is provided with a first ground wiring. In the present invention, the first ground wiring is routed through a double-layer or multi-layer metal wiring, and an electrostatic discharge (ESD) protection effect can be achieved in the use of a finished product.

14 Claims, 9 Drawing Sheets

(56) References Cited

U.S. PATENT DOCUMENTS

| | | | | |
|---|---|---|---|---|
| 10,199,400 B2* | 2/2019 | Xu | ............... | H01L 27/1244 |
| 10,228,783 B2* | 3/2019 | Schwager | ............... | G06F 3/041 |
| 10,921,660 B2* | 2/2021 | Xu | ............... | H01R 13/6594 |
| 11,126,314 B2* | 9/2021 | Tian | ............... | G06F 3/0443 |
| 11,360,610 B2* | 6/2022 | Fan | ............... | G06F 3/044 |
| 2012/0075218 A1* | 3/2012 | Lin | ............... | G06F 3/0418 |
| | | | | 345/173 |
| 2015/0077384 A1 | 3/2015 | Hong | | |
| 2015/0188218 A1* | 7/2015 | Elsherbini | ............... | H01Q 1/38 |
| | | | | 216/13 |
| 2016/0179255 A1 | 6/2016 | Yang et al. | | |
| 2017/0006702 A1 | 1/2017 | Park et al. | | |
| 2020/0110499 A1* | 4/2020 | Lee | ............... | G06F 3/044 |

FOREIGN PATENT DOCUMENTS

| CN | 103500036 A | 1/2014 |
|---|---|---|
| CN | 105097847 A | 11/2015 |
| CN | 105389033 A | 3/2016 |
| CN | 106201084 A | 12/2016 |
| CN | 106252358 A | 12/2016 |
| CN | 107703662 A | 2/2018 |
| CN | 109416598 A | 3/2019 |
| CN | 110462567 A | 11/2019 |
| CN | 110568655 A | 12/2019 |

* cited by examiner

MASK, DISPLAY PANEL, AND METHOD FOR MANUFACTURING THEREOF

The present application is a Continuation application of pending U.S. patent application Ser. No. 17/057,640, filed Nov. 20, 2020 and entitled "MASK, DISPLAY PANEL, AND METHOD FOR MANUFACTURING THEREOF", which claims priority to Chinese patent application no. 202010667733.6 submitted to Chinese Patent Office on Jul. 13, 2020, and claims priority to WIPO patent application no. PCT/CN2020/108136 submitted to WIPO Patent Office on Aug. 10, 2020, and the entire contents of which are incorporated herein by reference.

FIELD OF INVENTION

The present invention relates to the field of display technology, and in particular to a large spliced mask, a display panel, and a method for manufacturing thereof.

The manufacturing process of a large capacitive touch panel (TP) is similar to the manufacturing process of a liquid crystal display (LCD). Since a size of a mask is much smaller than a size of the TP to be produced, it is necessary to use the same mask for multiple exposures (shot) to splice a large TP. The spliced screen uses a smaller mask to expose a pattern in a certain area for multiple times, and repeat the exposure to splice the required TP.

In the prior art, in order to prevent electrostatic discharge (ESD), the TP wraps a ground (GND) wiring around the entire periphery of TP to shield the ESD in the environment of the TP product. However, in a lithography process of a large TP, the GND wiring around the TP will cause antenna effect because the wiring is too long, and thus will accumulate free charge during the etching process and result in an ESD, which will damage the surrounding effective wirings and devices.

Therefore, it is necessary to provide a display panel to alleviate the ground wiring antenna effect in the prior art.

The object of the present invention is to provide a display panel to improve the problem of ground wiring antenna effect in the prior art.

SUMMARY

In order to achieve the above object, the present invention provides a display panel. The display panel comprises a display area and a peripheral area surrounding the display area, the peripheral area comprises a wiring area and a bonding area; the wiring area is provided with a first ground wiring; the first ground wiring comprises: at least one first metal line segment and at least one second metal line segment, the first metal line segment and the second metal line segment are disposed in different insulating layers, and the first metal line segment is connected to the second metal line segment by a via hole; and projections of the first metal line segment and the second metal line segment on the substrate are in a straight line and do not overlap each other.

Furthermore, the display panel comprises: a substrate; a first metal layer disposed on the substrate; a first insulating layer disposed on the substrate and covering the first metal layer; a second metal layer disposed on the first insulating layer; a second insulating layer disposed on the first insulating layer and covering the second metal layer; and a transparent electrode layer disposed on the second insulating layer, the transparent electrode layer is connected to the first metal layer and the second metal layer.

Furthermore, in the wiring area, the second insulating layer is provided with a first through hole and a second through hole, the first through hole extends downward to a surface of the first metal layer, and the second through hole extends downward to a surface of the second metal layer; and the transparent electrode layer is connected to the first metal layer and the second metal layer through the first through hole and the second through hole.

Furthermore, the first metal line segment is disposed in the first metal layer; and the second metal line segment is disposed in the second metal layer.

Furthermore, the first metal line segment is disposed in the second metal layer; and the second metal line segment is disposed in the first metal layer.

Furthermore, the wiring area comprises: an upper wiring area defined on an upper side of the display area; a lower wiring area defined on a lower side of the display area; and a left wiring area defined on a left side of the display area. The left wiring area is connected to the upper wiring area and the lower wiring area. A second ground wiring is disposed in the upper wiring area, and a third ground wiring is disposed in the lower wiring area.

Furthermore, the first ground wiring is connected to the second ground wiring and the third ground wiring.

Furthermore, the second ground wiring is disposed in the first metal layer or the second metal layer.

Furthermore, the third ground wiring is disposed in the first metal layer or the second metal layer.

Furthermore, the display panel is connected to a chip on film in the bonding area.

The present invention further provides a mask for preparing the display panel, the mask comprises a first mask and a second mask; the first mask comprises a first pattern area, and the first pattern area has a same pattern as the first metal line segment; and the second mask comprises a second pattern area, and the second pattern area has a same pattern as the second metal line segment.

Furthermore, the first mask further comprises a third pattern area; and the third pattern area has a same pattern as a second ground wiring and a third ground wiring.

Furthermore, the second mask further comprises a third pattern area; and the third pattern area has a same pattern as a second ground wiring and a third ground wiring.

Furthermore, the mask further comprises a first splicing area for a first exposure and a second splicing area for a second exposure.

The present invention further provides a method for manufacturing a display panel, comprising steps of: providing a mask and a substrate, wherein the mask comprises a first mask and a second mask; the substrate comprises a display area and a peripheral area surrounding the display area, the peripheral area comprises a wiring area and a bonding area; depositing a metal material on the substrate to form a first metal layer; aligning the first mask with the substrate, wherein a first splicing area of the first mask is aligned with a first alignment mark on the substrate, and a second splicing area of the first mask is aligned with a second alignment mark on the substrate; covering a part of the first mask below the first splicing area, exposing the first metal layer for the first time, and patterning to form a part of a first metal line segment; moving the first mask, and moving the second splicing area to the first alignment mark for alignment; covering a part of the first mask above the second splicing area, exposing again the first metal layer for the first time, and patterning to form another part of the first metal line segment, the part of the first metal line segment and the another part of the first metal line segment constitute the first metal line segment; disposing a first insulating layer on the substrate and covering the first metal layer; removing the first mask, and aligning the second mask with the substrate, wherein the first splicing area is aligned with the first alignment mark on the substrate, the second splicing area is aligned with the second alignment mark on the substrate; covering a part of the second mask below the first splicing area, exposing the first metal layer for the first time, and patterning to form a part of a second metal line segment; moving the second mask, and moving the second splicing area to the first alignment mark for alignment; covering a part of the second mask above the second splicing area, exposing again the first metal layer for the first time, and patterning to form another part of the second metal line segment, the part of the second metal line segment and the another part of the second metal line segment constitute the second metal line segment; disposing a second insulating layer on the first insulating layer and covering the second metal layer; and disposing a transparent electrode layer on the second insulating layer, wherein the transparent electrode layer is connected to the first metal layer and the second metal layer.

Furthermore, before the step of disposing a second insulating layer on the first insulating layer and covering the second metal layer, the method further comprises: opening a first through hole and a second through hole on the second insulating layer corresponding to the wiring area, wherein the first through hole extends downward to a surface of the first metal layer, and the second through hole extends downward to a surface of the second metal layer; the transparent electrode layer is connected to the first metal layer and the second metal layer through the first through hole and the second through hole.

Furthermore, the first mask further comprises a third pattern area; and the third pattern area has a same pattern as a second ground wiring and a third ground wiring.

Furthermore, the second mask further comprises a third pattern area; and the third pattern area has a same pattern as a second ground wiring and a third ground wiring.

Furthermore, in the step of covering a part of the first mask below the first splicing area and exposing the first metal layer for the first time, the method further comprises: patterning to form the second ground wiring.

Furthermore, in the step of covering a part of the first mask above the second splicing area and exposing again the first metal layer for the first time, the method further comprises: patterning to form the third ground wiring.

The present invention provides a mask, a display panel and a method for manufacturing the same. In the present invention, the first ground wiring is routed through a double-layer or multi-layer metal wiring, and an ESD protection effect can be achieved in the use of a finished product. Specifically, as the first ground wiring, the original ground wiring of a single metal film layer is replaced with a double-layer or multi-layer metal film layer, which weakens the antenna effect that occurs in the single-film metal wiring process.

DESCRIPTION OF DRAWINGS

The technical solutions, as well as other beneficial advantages, of the present invention will be apparent from the following detailed descriptions of embodiments of the present invention, with reference to the attached drawings.

display panel 100; display area 110; wiring area 120; bonding area 130; first ground wiring 10; upper wiring area 1201; lower wiring area 1203; left wiring area 1202; substrate 101; first metal layer 12; first insulating layer 109; second metal layer 13; first through hole 1071; second insulating layer 107; transparent electrode layer 108; chip on film 106; first metal line segment 12; second metal line segment 13; second through hole 1072; first mask 200; second mask 300; first pattern area 201; second pattern area 301; third pattern area 202, 203; first splicing area 210, 220; second splicing area 310, 320; second ground wiring 104; third ground wiring 105.

DETAILED DESCRIPTION OF EMBODIMENTS

The specific structure and functional details disclosed herein are only representative, and are used for the purpose of describing exemplary embodiments of the present invention. However, the present invention can be implemented in many alternative forms, and should not be interpreted as being limited only to the embodiments set forth herein.

In description of the present invention, it should be understood that orientational or positional relationships represented by directional terms mentioned in the present invention, such as central, lateral, up, down, left, right, vertical, horizontal, top, bottom, inside, outside, etc., are orientational or positional relationships based on the drawings, and are merely for the convenience of describing the present invention and simplifying the description, rather than indicating or implying that the device or element is intended to have a particular orientation, or is constructed and operated in a particular orientation, and therefore, should not be interpreted as a limitation of the present invention. In addition, terms such as "first" and "second" are used herein for purposes of description, and should not be interpreted as indication or implication of relative importance, or implied indication of a number of the technical features. Therefore, features limited by terms such as "first" and "second" can explicitly or impliedly include one or more than one of these features. In description of the present invention, "a plurality of" means two or more than two, unless otherwise specified. Furthermore, the term "comprise" as well as any variants thereof are intended to cover a non-exclusive inclusion.

In the present invention, it is stated that, unless specified or limited otherwise, the terms "mounted," "connected," "coupled," "fixed" and the like are interpreted broadly, and may be, for example, supported connections, detachable connections, or integral connections; may also be mechanical or electrical connections; may also be direct connections or indirect connections via intervening structures; may also be inner communications of two elements. For those of ordinary skill in the art, the specific meanings of the above-mentioned terms in the present invention can be understood under specific circumstances.

The terminology used herein is only for describing specific embodiments and is not intended to limit the exemplary embodiments. Unless the context clearly dictates otherwise, the singular forms "a" and "one" used herein are also intended to include the plural. It should also be understood that the terms "including" and/or "comprising" used herein specify the existence of the stated features, integers, steps, operations, units and/or components, and do not exclude the existence or addition of one or more other features, integers, steps, operations, units, components, and/or combinations thereof.

Figure 1:
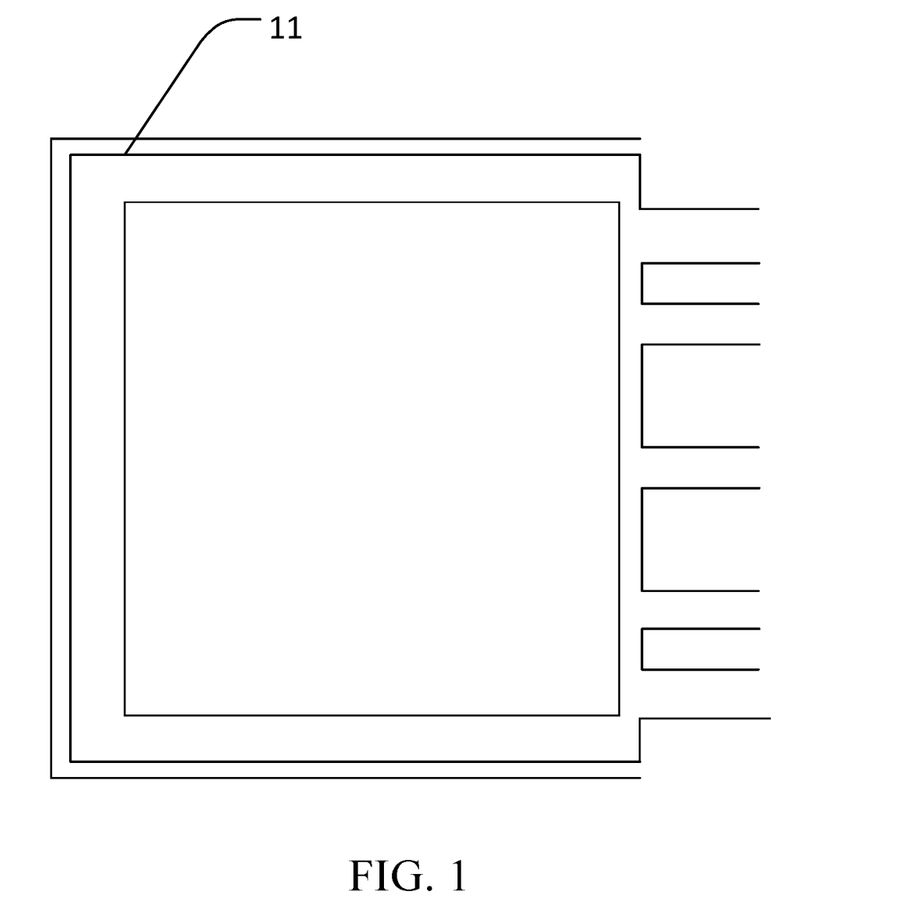
FIG. 1 is a plan view of a display panel in the prior art.
Figure 2:
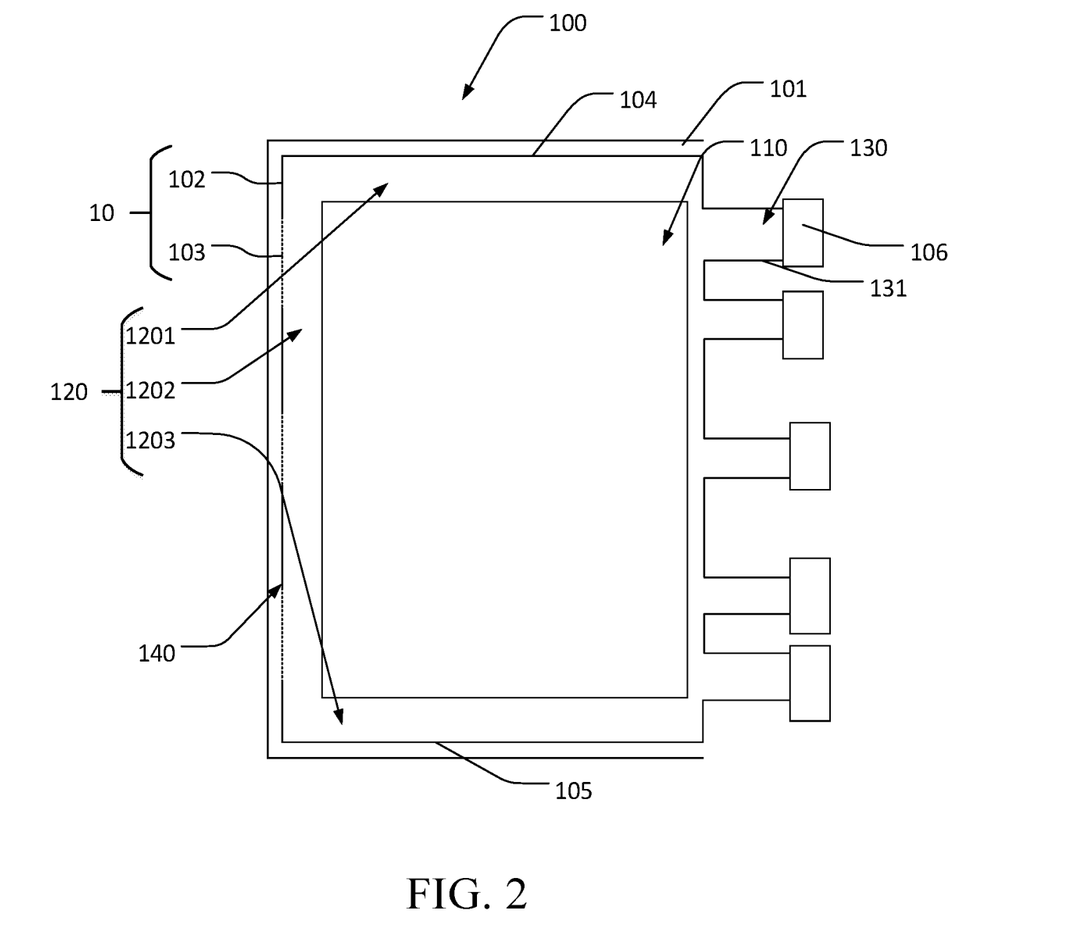
FIG. 2 is a schematic plan view of a display panel in accordance with the present invention.

As shown in FIG. 2, the present invention provides a display panel 100 comprising a display area 110 and a peripheral area surrounding the display area 110, and the peripheral area comprises a wiring area 120 and a bonding area 130.

The wiring area 120 is provided with a first ground wiring 10.

The first ground wiring 10 comprises: at least one first metal line segment and at least one second metal line segment 13; the first metal line segment and the second metal line segment 13 are disposed in different insulating layers, and the first metal line segment is connected to the second metal line segment 13 through a via hole.

Projections of the first metal line segment and the second metal line segment 13 on a substrate 101 are in a straight line and do not overlap each other.

In the present invention, the first ground wiring 10 is defined by a double-layer or multi-layer metal wiring, which can achieve the ESD protection effect in the use of the finished product.

The present invention replaces the original ground wiring of a single metal film layer with a double-layer or multi-layer metal film layer as the first ground wiring 10, which weakens the antenna effect that occurs in the single-film metal wiring process.

Figure 3:
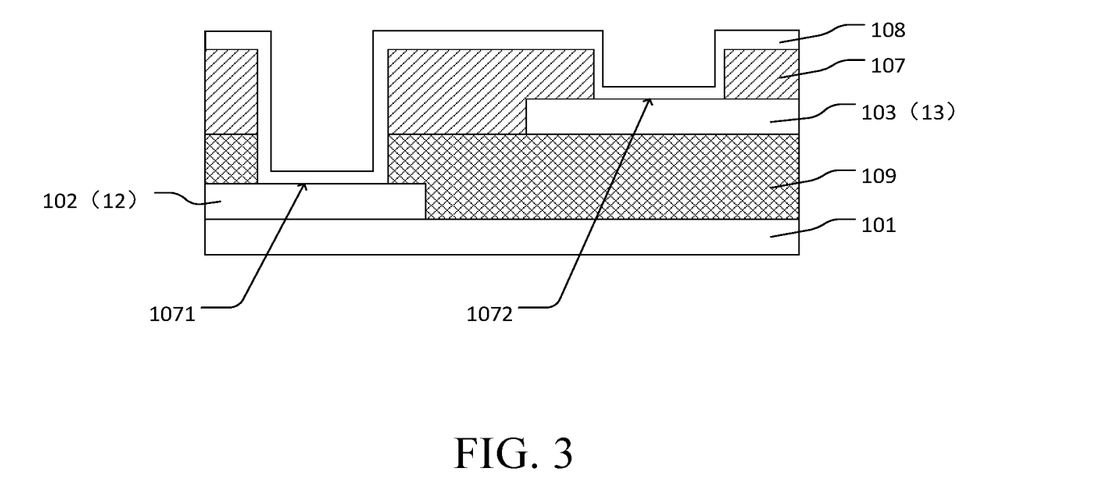
FIG. 3 is a cross-sectional view of a connection at a mark 140 shown in FIG. 2.

As shown in FIG. 3, the layer structure of the display panel 100 comprises a substrate 101, a first metal layer 12, a first insulating layer 109, a second metal layer 13, a second insulating layer 107, and a transparent electrode layer 108.

The first metal layer 12 is disposed on the substrate 101. The first insulating layer 109 is disposed on the substrate 101 and covers the first metal layer 12.

The second metal layer 13 is disposed on the first insulating layer 109. The second insulating layer 107 is disposed on the first insulating layer 109 and covers the second metal layer 13.

The transparent electrode layer 108 is disposed on the second insulating layer 107, and the transparent electrode layer 108 is connected to the first metal layer 12 and the second metal layer 13.

In one embodiment, in the wiring area 120, the second insulating layer 107 is provided with a first through hole 1071 and a second through hole 1072; the first through hole 1071 extends downward to a surface of the first metal layer 12, and the second through hole 1072 extends downward to a surface of the second metal layer 13.

In one embodiment, the first metal line segment is disposed in the first metal layer 12, and the second metal line segment is disposed in the second metal layer 13. Alternatively, the first metal line segment is disposed in the second metal layer 13, and the second metal line segment is disposed in the first metal layer 12.

Of course, the present invention can also comprise other metal layers. The routing of the first ground wiring 10 is not only limited to the first metal layer 12 and the second metal layer 13, but can also be defined in a metal layer with more than two layers in a jumper configuration.

The wiring area 120 comprises an upper wiring area 1201, a lower wiring area 1203, and a left wiring area 1202.

The upper wiring area 1201 is defined on an upper side of the display area 110; the lower wiring area 1203 is defined on a lower side of the display area 110; and the left wiring area 1202 is defined on a left side of the display area 110. The left wiring area 1202 is connected to the upper wiring area 1201 and the lower wiring area 1203.

A second ground wiring 104 is disposed in the upper wiring area 1201, and a third ground wiring 105 is disposed in the lower wiring area 1203. The first ground wiring 10 is connected to the second ground wiring 104 and the third ground wiring 105.

The second ground wiring 104 is disposed in the first metal layer 12 or the second metal layer 13; and/or the third ground wiring 105 is disposed in the first metal layer 12 or the second metal layer 13.

In the bonding area 130, the display panel 100 is connected to a chip on film 106 through a bonding wiring 131. The display area 110 further comprises a transmission electrode wiring (Tx) arranged horizontally and a receiving electrode wiring (Rx) arranged longitudinally.

The transmission electrode wiring and the receiving electrode wiring are merged in the bonding area 130 and are connected to the chip on film 106 by terminals.

The present invention further provides a mask for preparing the display panel 100.

Figure 4:
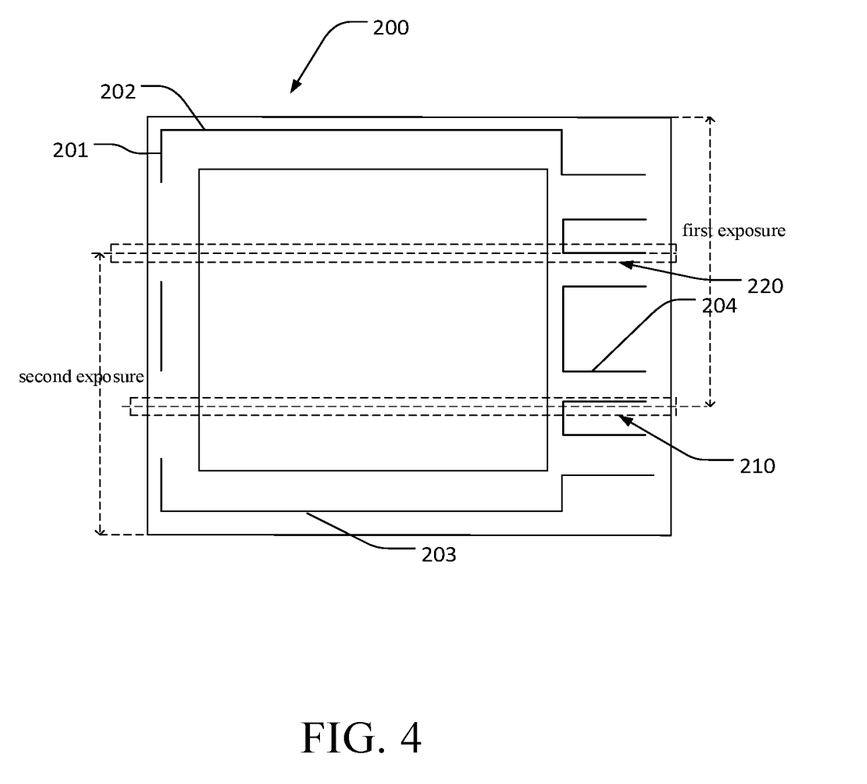
FIG. 4 is a schematic plan view of a first mask 200 in accordance with the present invention.
Figure 5:
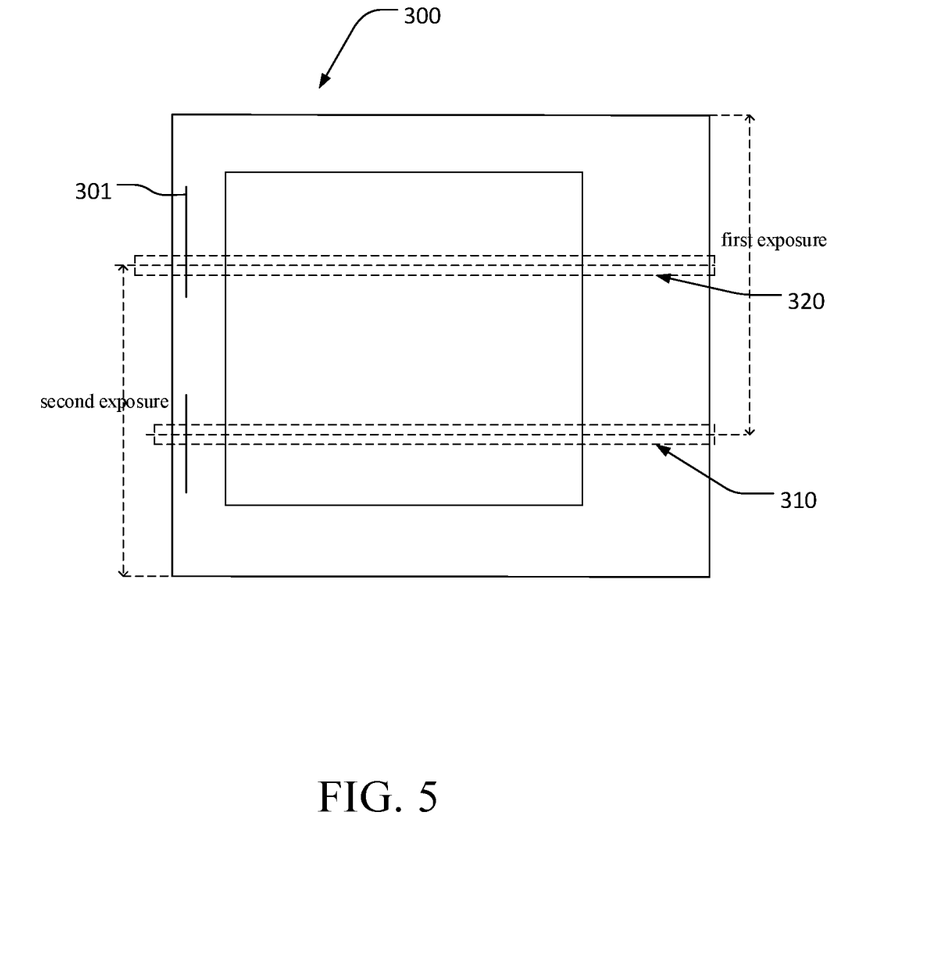
FIG. 5 is a schematic plan view of a second mask in accordance with the present invention.

As shown in FIG. 4 and FIG. 5, the mask comprises a first mask 200 and a second mask 300.

The first mask 200 comprises a first pattern area 201, and the first pattern area 201 has a same pattern as the first metal line segment.

The first pattern area 201 is a transparent area. The first mask 200 is used to pattern the first metal layer 12.

The second mask 300 comprises a second pattern area 301, and the second pattern area 301 has a same pattern as the second metal line segment 13.

The second pattern area 301 is a transparent area. The second mask 300 is used to pattern the second metal layer 13.

The first mask 200 further comprises a third pattern area (202, 203); or, the second mask 300 further comprises a third pattern area.

The third pattern area (202, 203) has a same pattern as the second ground wiring 104 and the third ground wiring 105.

In the present invention, preferably, the third pattern area (202, 203) is disposed on the first mask 200, and the third pattern area is connected to the first pattern area 201.

The mask further comprises a first splicing area 210 for a first exposure and a second splicing area 220 for a second exposure.

The present invention provides a method for manufacturing a display panel, comprising the following steps.

Step S1, providing a mask (referring to FIG. 4 and FIG. 5 for details) and a substrate 101. The substrate 101 comprises a display area 110 and a peripheral area surrounding the display area 110, and the peripheral area comprises a wiring area and a bonding area 130.

Figure 6:
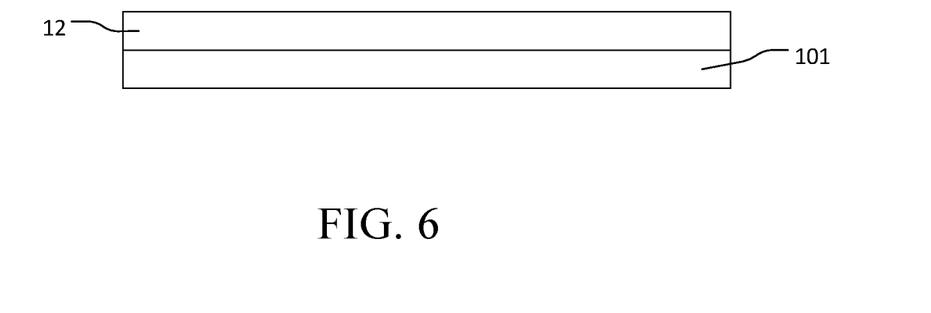
FIG. 6 is a schematic structural diagram of step S2 in a method for manufacturing the display panel in accordance with the present invention.

Step S2, as shown in FIG. 6, depositing a metal material on the substrate 101 to form a first metal layer 12.

Figure 7:
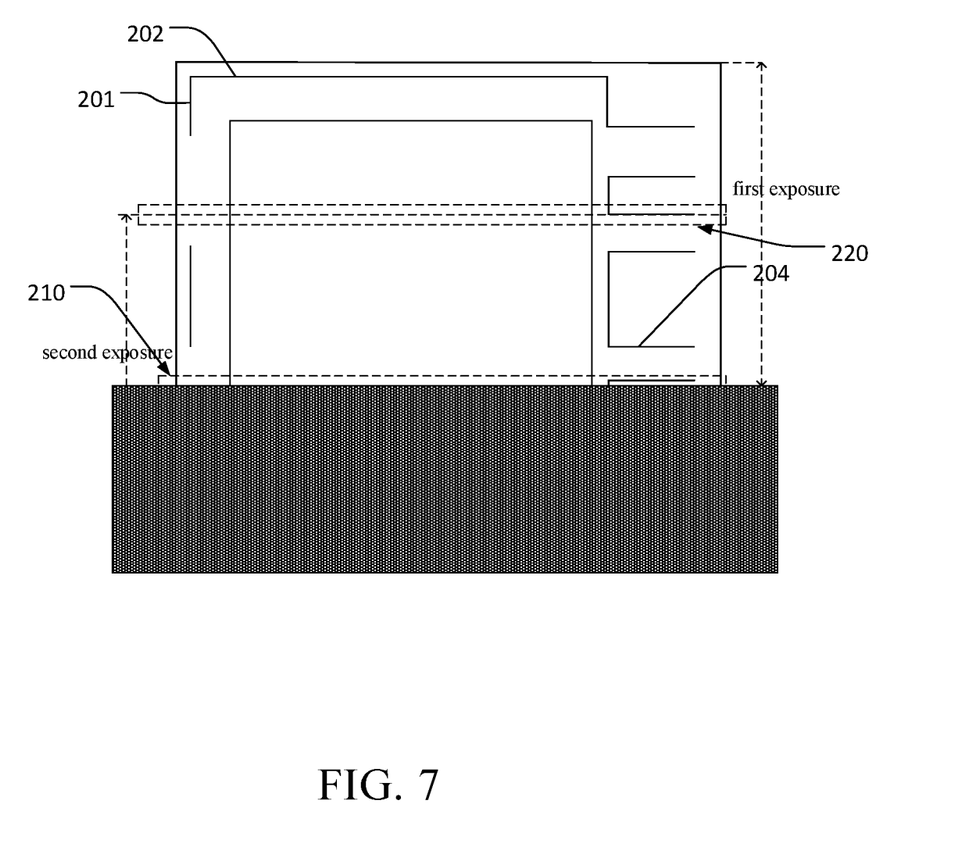
FIG. 7 is a schematic structural diagram of step S3 in the method for manufacturing the display panel in accordance with the present invention.

Step S3, as shown in FIG. 7, aligning the first mask 200 with the substrate 101. A first splicing area is aligned with a first alignment mark on the substrate 101. A second splicing area is aligned with a second alignment mark on the substrate 101. Since the first alignment mark and the second alignment mark overlap the first splicing area and the second splicing area respectively, they are not shown in the figures.

Step S4, covering part of the first mask 200 below the middle of the first splicing area 210, exposing the first metal layer 12 for a first time and patterning to form part of a first metal line segment and a second ground wiring 104.

Figure 8:
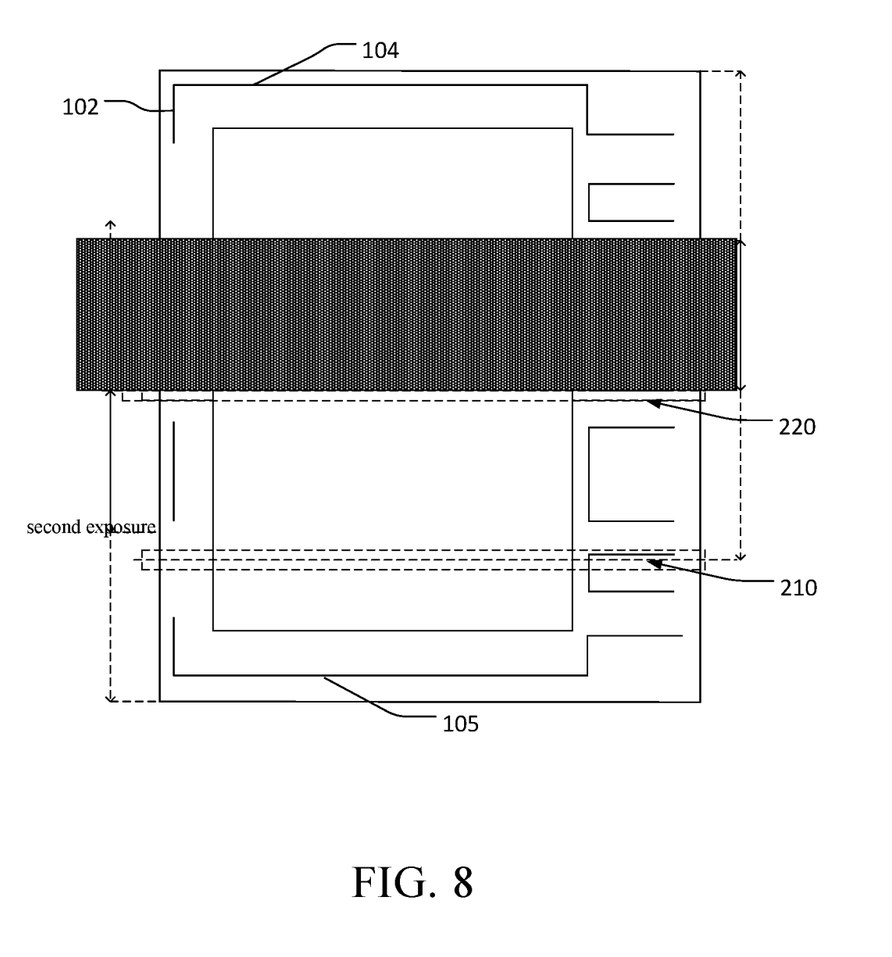
FIG. 8 is a schematic structural diagram of step S5 in the method for manufacturing the display panel in accordance with the present invention.

Step S5, as shown in FIG. 8, moving the first mask 200, and moving the second splicing area 220 to the first alignment mark for alignment.

Step S6, covering a part of the first mask above the middle of the second splicing area 220, exposing again the first metal layer 12 for the first time and patterning to form another part of the first metal line segment and a third ground wiring 105. The part of the first metal line segment and the another part of the first metal line segment constitute the first metal line segment.

Figure 9:
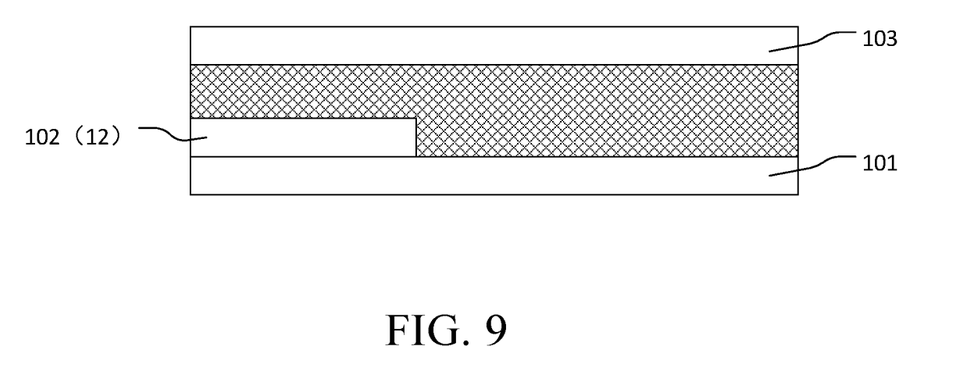
FIG. 9 is a schematic structural diagram of step S7 in the method for manufacturing the display panel in accordance with the present invention.

Step S7, as shown in FIG. 9, disposing a first insulating layer 109 on the substrate 101 and covering the first metal layer 12.

Figure 10:
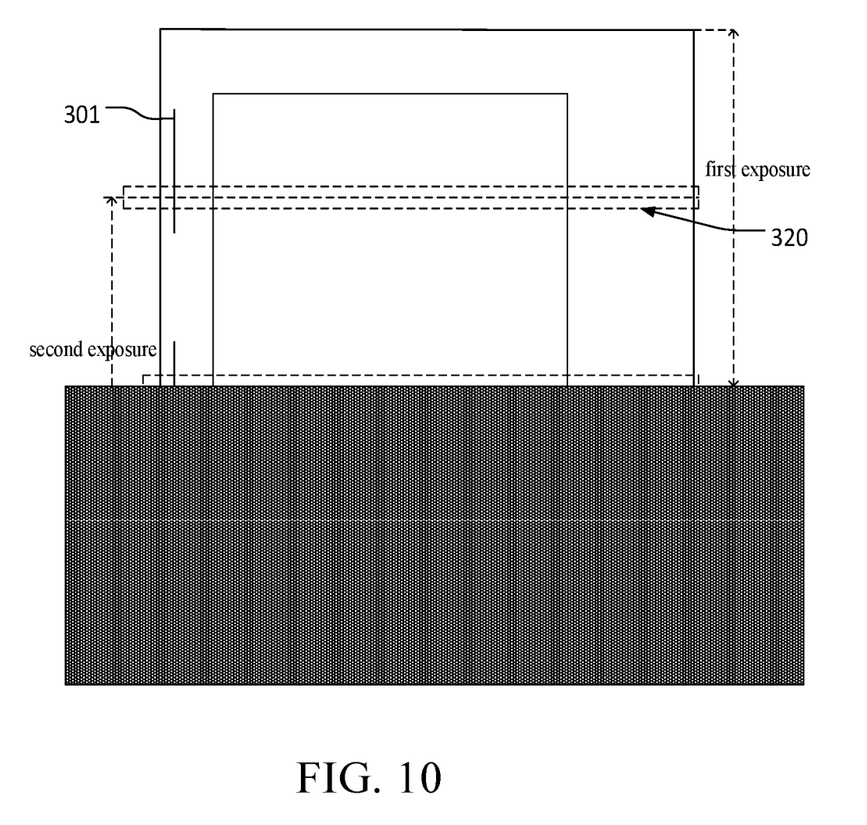
FIG. 10 is a schematic structural diagram of step S8 in the method for manufacturing the display panel in accordance with the present invention.

Step S8, as shown in FIG. 10, removing the first mask 200, and aligning a second mask 300 with the substrate 101. A first splicing area 310 is aligned with the first alignment mark on the substrate 101. A second splicing area 320 is aligned with the second alignment mark on the substrate 101. Since the first alignment mark and the second alignment mark overlap the first splicing area and the second splicing area respectively, they are not shown in the figures.

Step S9, covering part of the second mask 300 below the middle of the first splicing area 310, exposing the first metal layer 12 for a first time and patterning to form part of a second metal line segment 13.

Figure 11:
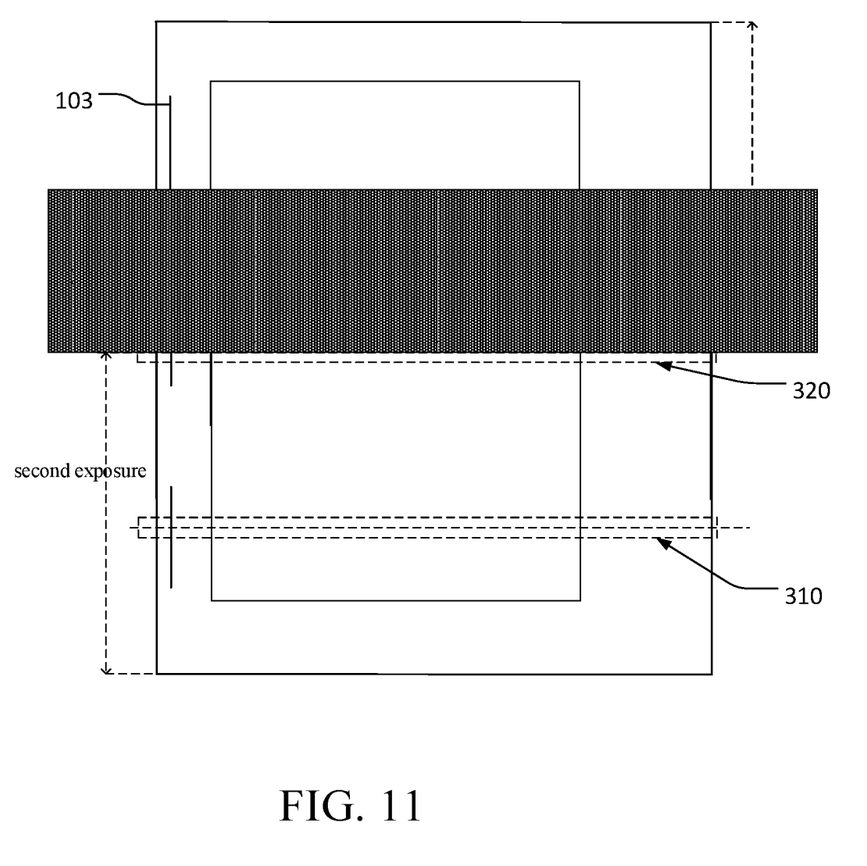
FIG. 11 is a schematic structural diagram of step S10 in the method for manufacturing the display panel in accordance with the present invention.

Step S10, as shown in FIG. 11, moving the second mask 300, and moving the second splicing area 320 to the first alignment mark for alignment.

Step S11, covering a part of the second mask 300 above the middle of the second splicing area 320, exposing again the first metal layer 12 for the first time, and patterning to form another part of the second metal line segment 13. The part of the second metal line segment 13 and the another part of the second metal line segment 13 constitute the second metal line segment.

Figure 12:
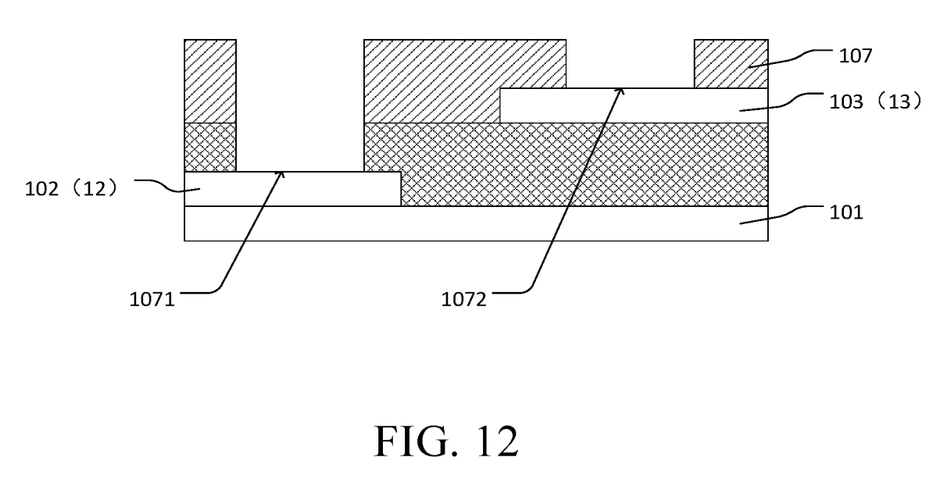
FIG. 12 is a schematic structural diagram of step S12 in the method for manufacturing the display panel in accordance with the present invention.

Step S12, as shown in FIG. 12, disposing a second insulating layer 107 on the first insulating layer 109 and covering the second metal layer 13.

Step S13, opening a first through hole 1071 and a second through hole 1072 on the second insulating layer 107 corresponding to a wiring area 120. The first through hole 1071 extends downward to a surface of the first metal layer 12, and the second through hole 1072 extends downward to a surface of the second metal layer 13.

Step S14, disposing a transparent electrode layer 108 on the second insulating layer 107. The transparent electrode layer 108 is connected to the first metal layer 12 and the second metal layer 13.

In summary, although the present invention has been disclosed in the above preferred embodiments, the above preferred embodiments do not intend to limit the present invention. Various modifications and changes may be made by those skilled in the art without departing from the spirit and scope of the present invention. Therefore, the scope of protection of the present invention is subject to the scope defined by the claims.

What is claimed is:

1. A display panel, comprising a display area and a peripheral area surrounding the display area, wherein the peripheral area comprises a wiring area and a bonding area;
   the wiring area is provided with a first ground wiring;
   the first ground wiring comprises at least one first metal line segment and at least one second metal line segment; the first metal line segment and the second metal line segment are disposed in different insulating layers; and
   projections of the first metal line segment and the second metal line segment on the substrate are in a straight line and do not overlap each other,
   wherein the display panel further comprises:
   a transparent electrode layer disposed above the first metal line segment and the second metal line segment, wherein the transparent electrode layer is connected to the first metal line segment and the second metal line segment through a through hole disposed in the insulating layers.

2. The display panel as claimed in claim 1, wherein the display panel further comprises:
   a substrate;
   a first metal layer disposed on the substrate;
   a first insulating layer disposed on the substrate and covering the first metal layer;
   a second metal layer disposed on the first insulating layer; and
   a second insulating layer disposed on the first insulating layer and covering the second metal layer;
   wherein the transparent electrode layer is disposed on the second insulating layer.

3. The display panel as claimed in claim 2, wherein
   in the wiring area, the second insulating layer is provided with a first through hole and a second through hole; the first through hole extends downward to a surface of the first metal layer, and the second through hole extends downward to a surface of the second metal layer; and
   the transparent electrode layer is connected to the first metal layer and the second metal layer through the first through hole and the second through hole.

4. The display panel as claimed in claim 2, wherein
   the first metal line segment is disposed in the first metal layer; and
   the second metal line segment is disposed in the second metal layer.

5. The display panel as claimed in claim 2, wherein
   the first metal line segment is disposed in the second metal layer; and
   the second metal line segment is disposed in the first metal layer.

6. The display panel as claimed in claim 1, wherein the wiring area comprises:
   an upper wiring area defined on an upper side of the display area;

a lower wiring area defined on a lower side of the display area; and a left wiring area defined on a left side of the display area, wherein the left wiring area is connected to the upper wiring area and the lower wiring area, wherein a second ground wiring is disposed in the upper wiring area, and a third ground wiring is disposed in the lower wiring area.

7. The display panel as claimed in claim 6, wherein the first ground wiring is connected to the second ground wiring and the third ground wiring.

8. The display panel as claimed in claim 6, wherein the second ground wiring is disposed in the first metal layer or the second metal layer.

9. The display panel as claimed in claim 6, wherein the third ground wiring is disposed in the first metal layer or the second metal layer.

10. A mask for preparing the display panel as claimed in claim 6;

the mask comprises a first mask and a second mask;

the first mask comprises a first pattern area, and the first pattern area has a same pattern as the first metal line segment; and the second mask comprises a second pattern area, and the second pattern area has a same pattern as the second metal line segment.

11. The mask as claimed in claim 10, wherein the first mask further comprises a third pattern area; and the third pattern area has a same pattern as the second ground wiring and the third ground wiring.

12. The mask as claimed in claim 10, wherein the second mask further comprises a third pattern area; and the third pattern area has the same pattern as the second ground wiring and the third ground wiring.

13. The mask as claimed in claim 10, wherein the mask further comprises a first splicing area for a first exposure and a second splicing area for a second exposure.

14. The display panel as claimed in claim 1, wherein the display panel is connected to a chip on film in the bonding area.

* * * * *